US012139089B2

(12) United States Patent
Yamazaki

(10) Patent No.: US 12,139,089 B2
(45) Date of Patent: Nov. 12, 2024

(54) OCCUPANT PROTECTING SYSTEM

(71) Applicant: DAICEL CORPORATION, Osaka (JP)

(72) Inventor: Masayuki Yamazaki, Tokyo (JP)

(73) Assignee: DAICEL CORPORATION, Osaka (JP)

(*) Notice: Subject to any disclaimer, the term of this patent is extended or adjusted under 35 U.S.C. 154(b) by 373 days.

(21) Appl. No.: 17/606,187

(22) PCT Filed: Mar. 31, 2020

(86) PCT No.: PCT/JP2020/014866
§ 371 (c)(1),
(2) Date: Oct. 25, 2021

(87) PCT Pub. No.: WO2020/217884
PCT Pub. Date: Oct. 29, 2020

(65) Prior Publication Data
US 2022/0219636 A1 Jul. 14, 2022

(30) Foreign Application Priority Data
Apr. 26, 2019 (JP) .................................. 2019-086139

(51) Int. Cl.
*B60N 2/20* (2006.01)
*B60N 2/22* (2006.01)
(Continued)

(52) U.S. Cl.
CPC ................ *B60R 21/08* (2013.01); *B60N 2/20* (2013.01); *B60R 21/0132* (2013.01);
(Continued)

(58) Field of Classification Search
CPC ........ B60N 2/20; B60N 2/22; B60R 21/0132; B60R 21/0134; B60R 21/01516;
(Continued)

(56) References Cited

U.S. PATENT DOCUMENTS 10,106,156 B1 * 10/2018 Nave .......................... G08G 1/16
11,364,869 B1 * 6/2022 Lin ......................... B60R 21/207
(Continued)

FOREIGN PATENT DOCUMENTS

CN        108944589 A     12/2018
DE  10 2007 002 185 A1     7/2008
(Continued)

OTHER PUBLICATIONS

English translation of the Chinese Office Action and Search Report for corresponding Chinese Application No. 202080031168.2, dated Feb. 7, 2023.
(Continued)

*Primary Examiner* — Erick R Solis
(74) *Attorney, Agent, or Firm* — Birch, Stewart, Kolasch & Birch, LLP

(57) ABSTRACT

In a vehicle, an occupant is suitably protected even when the occupant is seated in the vehicle with the seat inclined and facing a direction different from the advancing direction of the vehicle. A system for protecting an occupant boarding on a seat in a vehicle, where a seat back of the seat is configured to be inclinable with respect to a seat cushion of the seat. The system includes an acquiring unit that acquires environment information related to the vehicle in traveling or the surrounding environment thereof; and a control unit that, when the seat is facing a direction different from an advancing direction of the vehicle and the seat back is in an inclined state with respect to the seat cushion by greater than or equal to a predetermined angle, executes a support control to support the occupant in the seat to resist an inertial force that is assumed to act on the occupant boarding on the seat, based on the environment information.

10 Claims, 10 Drawing Sheets

(51) Int. Cl.
*B60R 21/0132* (2006.01)
*B60R 21/0134* (2006.01)
*B60R 21/015* (2006.01)
*B60R 21/08* (2006.01)
*B60R 21/207* (2006.01)
*B60R 21/01* (2006.01)
*B60R 21/02* (2006.01)
*B60R 21/231* (2011.01)

(52) U.S. Cl.
CPC .... *B60R 21/0134* (2013.01); *B60R 21/01516* (2014.10); *B60R 21/207* (2013.01); *B60R 2021/01013* (2013.01); *B60R 2021/01245* (2013.01); *B60R 2021/0273* (2013.01); *B60R 2021/23153* (2013.01)

(58) Field of Classification Search
CPC ............ B60R 21/01554; B60R 21/207; B60R 2021/01013; B60R 2021/01245; B60R 2021/0273; B60R 2021/23153
USPC ...................................................... 701/45–49
See application file for complete search history.

(56) References Cited

U.S. PATENT DOCUMENTS

| | | | |
|---|---|---|---|
| 2015/0137492 A1* | 5/2015 | Rao ........................ | B62D 1/183 280/732 |
| 2017/0210247 A1* | 7/2017 | Rao .................... | B60R 21/01554 |
| 2017/0210322 A1* | 7/2017 | Rao ........................ | G01D 5/142 |
| 2018/0215338 A1 | 8/2018 | Faruque et al. | |
| 2019/0299896 A1* | 10/2019 | Nagasawa ............. | B60R 21/013 |
| 2019/0299919 A1* | 10/2019 | Raikar ................ | B60R 21/0136 |
| 2020/0047770 A1 | 2/2020 | Ozawa et al. | |
| 2020/0130680 A1* | 4/2020 | Cho ...................... | B60W 30/09 |
| 2020/0164771 A1* | 5/2020 | Unnervik ............ | B60N 2/42745 |
| 2020/0339012 A1* | 10/2020 | Humer ................... | B60N 2/026 |

FOREIGN PATENT DOCUMENTS

| | | |
|---|---|---|
| JP | 2010-126141 A | 6/2010 |
| JP | 2017-94923 A | 6/2017 |
| JP | 2018-52347 A | 4/2018 |
| JP | 2018-150003 A | 8/2018 |
| JP | 2018-167626 A | 11/2018 |
| JP | 2019-34674 A | 3/2019 |

OTHER PUBLICATIONS

International Preliminary Report on Patentability and English translation of the Written Opinion of the International Searching Authority for International Application No. PCT/JP2020/014866, dated Sep. 28, 2021.

International Search Report for International Application No. PCT/JP2020/014866, dated Jun. 2, 2020, with English translation.

* cited by examiner

OCCUPANT PROTECTING SYSTEM

TECHNICAL FIELD

The present invention relates to an occupant protection system that protects an occupant boarding on a seat in a vehicle.

BACKGROUND ART

In vehicles, it is known to use an occupant restraining device such as a seatbelt or various airbags to protect the occupant from impact of a collision. For example, various types of airbag devices such as a front side collision airbag that deploys from a steering wheel, an instrument panel, or the like toward a front side of an occupant; a knee protection airbag (a knee bag) that deploys at a lower portion of a steering column; a side collision airbag that deploys from the seat side portion toward the side of the occupant; and a curtain airbag that deploys along a side door glass have become widespread.

Here, the posture of the occupant in the vehicle varies, and the occupant is not necessarily seated in the seat facing the front side of the vehicle. For example, in the vehicle described in Patent Document 1, a state is formed in which an occupant seated in the front row of the vehicle is facing the rear side and facing the occupant in the rear row. When an impact is applied to the vehicle in such a state, the airbag is deployed to protect the occupant. Specifically, as illustrated in FIG. 7 of Patent Document 1, the airbag is deployed in a horseshoe shape when viewed from above to cover the rear surface and the side surfaces of the occupant in the front row, and to cover the front surface and the side surfaces of the occupant in the rear row. With such a deployment, a state is formed in which each of the occupants has four sides surrounded by an airbag or a seat, and protection thereof is achieved.

CITATION LIST

Patent Document

Patent Document 1: US 2018/0,215,338 A

SUMMARY OF INVENTION

Technical Problem

In recent years, the development of automatic driving technique for vehicles has become popular. In such automated driving technique, the occupant is ultimately freed from the driving of the vehicle, and thus the occupant may not necessarily be seated on the seat while facing the advancing direction of the vehicle. As such, the known form may not be applied as is for a protection system using a restraining device or the like for protecting an occupant. For example, under an automated driving technique, a state in which the vehicle is driven while the occupant is facing the rear side in the vehicle may arise, as shown in the prior art described above, where if the occupant facing the rear side has the seat inclined, it may be difficult to suitably support the occupant with the seat back against the impact at the time of collision from the front side. Without sufficient support by the seat back in this way, protection of the occupant becomes difficult.

In light of the problems described above, an object of the present specification is to provide a technique for suitably protecting an occupant even in a case where the occupant is seated in the vehicle with the seat inclined while facing a direction different from the advancing direction of the vehicle.

Solution to Problem

To solve the problems described above, the present disclosure employs a configuration in which a support control is performed to support the occupant in consideration of the inertial force assumed to act on the occupant when the occupant is seated while facing the direction different from the advancing direction of the vehicle and with the seat inclined. Such support control allows the occupant to be suitably protected regardless of the seating posture of the occupant in the vehicle.

Specifically, the present disclosure provides an occupant protection system that protects an occupant boarding on a seat in a vehicle, a seat back of the seat being configured to be inclinable with respect to a seat cushion of the seat, the occupant protection system including: an acquiring unit that acquires environment information related to the vehicle in traveling or a surrounding environment thereof; and a control unit that, when the seat is facing a direction different from an advancing direction of the vehicle and the seat back is in an inclined state with respect to the seat cushion at greater than or equal to a predetermined angle, executes a support control for supporting the occupant in the seat to resist an inertial force that is assumed to act on the occupant boarding on the seat, based on the environment information.

The occupant protection system of the present disclosure is a system for protecting an occupant boarding on a seat in a vehicle, and the seat is configured such that the seat back is inclinable with respect to a seat cushion on which the occupant is seated. Note that the inclinable configuration is not limited to a specific configuration. Here, when the occupant sits on the seat, the seat back may be in a relatively upright state with respect to the seat cushion. At this time, the seat back may basically function to support the occupant when an impact applies on the vehicle. Therefore, the occupant can be protected from the impact by restraining the occupant with respect to such a seat back. On the other hand, in a case where the seat on which the occupant sits is facing a direction different from the advancing direction of the vehicle and the seat is in an inclined state inclined by greater than or equal to a predetermined angle, it is difficult to suitably support the occupant by the seat back if an inertial force acts on the occupant. That is, when the seat back is inclined with respect to the seat cushion, the occupant's body easily slips along the seat back, and thus it is not easy to support the occupant by the seat back.

In view of the new problems that arise due to such seat orientation and seat back inclination, the occupant protection system of the present disclosure is configured such that the control unit executes a support control related to the support of the user to resist the inertial force assumed to act on the occupant. In other words, the support control is performed to suppress user slippage along the seat back described above. This inertial force does not always act on the occupant in the same direction and the magnitude thereof is also not constant, depending on the traveling state of the vehicle, the correlation between the vehicle and the obstacle at the periphery thereof, and the like. Thus, environment information related to the vehicle in traveling or the surrounding environment thereof is utilized for this support control. The environment information is preferably information that is useful for grasping the inertial force assumed to act on the occupant, and examples include information relating to the traveling speed of the vehicle, the position of the obstacle located at the periphery of the vehicle, the presence or absence of the seating occupant, the weight of the occupant, and the like. These pieces of information can be acquired by the acquiring unit from various sensors provided on the vehicle side, or by receiving information transmitted from a server or the like outside the vehicle.

When the vehicle is assumed to have an inertial force acting thereon, the support control is performed by the control unit to suppress the occupant's body from slipping along the seat back. As a result, even when the seat is in an inclined state, the support of the occupant by the seat back can be achieved, and effective occupant protection can be achieved. Note that the support control may be performed when the seat back is inclined to an extent that occupant slippage with respect to the seat back is a concern, that is, when the inclined angle of the seat back is greater than or equal to a predetermined angle. When the extent of inclination of the seat back is small, that is, when the inclined angle of the seat back with respect to the seat cushion is smaller than the predetermined angle, the support control by the control unit may not be performed. Note that, for the inclined angle of the present application, the smaller the inclined angle, the closer the seat back is to an upright state.

Here, in the occupant protection system described above, various forms can be applied to the support control performed by the control unit. The following illustrates the application form. First, as a first application form, when the seat is facing a direction opposite to the advancing direction of the vehicle and the seat back is in the inclined state, the control unit may execute the support control to have a posture of the seat on which the occupant is located in a predetermined upright posture to resist the inertial force that is assumed to act on the occupant boarding on the seat when collision of the vehicle is predicted based on the environment information. In other words, in the first application mode, when a collision of the vehicle is predicted based on the environment information, the above-described support control is performed to prepare for the collision in advance.

Then, in the support control of the first application form, the posture of the seat on which the occupant is seated is adjusted to a predetermined upright posture. The predetermined upright posture is a posture for supporting the occupant, in which the seat can be raised to resist inertial forces. The predetermined upright posture merely needs to be a posture that can support an occupant, and a predetermined upright posture can be obtained by deforming, displacing, or the like the entire seat or a portion of the seat. By controlling the posture of the seat based on the prediction of the collision in this way, it becomes possible to prepare for collision in advance, and therefore, even if a collision of the vehicle occurs, the protection of the occupant can be more accurately obtained.

Here, as an example for achieving a predetermined upright posture, the seat back may include a base portion connected to the seat cushion, and a movable portion having a contact surface with the occupant and configured to rise with respect to the base portion; and the control unit may cause the movable portion to rise with respect to the base portion to form the predetermined upright posture while maintaining a relative relationship between the base portion and the seat cushion. That is, rather than raising the entire seat back, the movable portion, which is a part thereof, is raised to form the predetermined upright posture. Such a configuration allows the support control for obtaining the predetermined upright posture to be executed rapidly and with less energy, thus allowing accurate preparation for collision.

Here, in the occupant protection system described above, the control unit may perform the support control to cause the movable portion to rise with respect to the base portion and to bring the seat closer to the predetermined upright posture, as a distance between the vehicle and an obstacle at the periphery thereof, with which collision is assumed, included in the environment information, becomes shorter. The shorter distance between the vehicle and the obstacle means that the possibility of a collision with the obstacle increases. Therefore, by performing the support control to bring the seat closer to a predetermined upright posture as the possibility of a collision increases, the preparation for the collision can be achieved in advance and sudden change in the posture of the seat can be avoided. This can suppress a sudden change in body posture from being imposed on the occupant when a support control is performed, thus achieving both occupant protection and comfort of the occupant in a vehicle.

Furthermore, in the occupant protection system described above, the seat may include a gas generator that generates gas due to combustion of an explosive, and the seat is configured to cause the movable portion to rise with respect to the base portion by the gas supplied from the gas generator, and the seat back may include a reducing means that reduces a relative speed of the movable portion with respect to the base portion. The movable portion can be rapidly moved to form a predetermined upright posture by using the gas generated by the gas generator. However, if the movement of the movable portion is too fast, it may impose a sudden change in body posture on the occupant, and thus is not preferable. Thus, excessive fast movement of such a movable portion can be suppressed by providing the reducing means in the seat back.

An example of the reducing means includes a damper device. As another method, a means for controlling a supply amount of the gas supplied from the gas generator per unit time for raising operation of the movable portion may be adopted as the reducing means. Since the supplied gas is a power source for raising the movable portion, the relative speed of the movable portion with respect to the base portion can be reduced by controlling the supply amount.

Here, as another example for achieving a predetermined upright posture, the control unit may raise a head side of the seat to a greater degree than a foot side of the seat, while maintaining the inclined state of the seat back with respect to the seat cushion to form the predetermined upright posture. That is, a predetermined upright posture, which is a supporting state by the seat, that can resist an inertial force assumed to act on the occupant is formed by moving the entire seat.

Next, a second application form of the support control in the occupant protection system will be described. In the second application form, in a case where restraining of the occupant by a restraining device for restraining an occupant located on a seat to the seat is not performed and the seat back is in the inclined state, when collision of the vehicle is detected based on the environment information or determination is made that the collision is inevitable, the control unit executes the restraining of the occupant by the restraining device as the support control to resist the inertial force. That is, in the second application form, in a case where a collision of the vehicle is detected based on the environment information, or if determination is made that a collision is inevitable even before a collision, the support control is performed to protect the occupant from the collision. Note that in the state before the support control of the present application form is performed, the restraining of the occupant by the restraining device is not performed. The restraining of the occupant is performed by the restraining device on the basis of the detection of collision and the relatively high probability, whereby when an inertial force acts on the occupant due to a collision, slipping movement of the occupant's body along the seat back can be suppressed, and protection of the occupant can be achieved.

In the occupant protection system described above, the restraining device may be a shoulder airbag that is provided on the seat to abut against a shoulder of the occupant located on the seat when inflated, and that has a predetermined inflation size that is greater than a head size of the occupant along the advancing direction of the vehicle when inflated; and when collision of the vehicle is detected or determination is made that the collision is inevitable when the seat back is in the inclined state, the control unit may inflate the shoulder airbag. When the seat is in an inclined state, the inertial force causes the occupant to slip from the head. Thus, the occupant can be effectively protected against the inertial force by restraining the movement of the occupant's body at the shoulder close to the head with the shoulder airbag. Note that it is not preferable for the force to be applied to the head when restraining the movement of the occupant. Thus, the shoulder airbag has a predetermined inflation size that is greater than the head size of the occupant in the advancing direction of the vehicle. According to this configuration, with the inflated shoulder airbag, the occupant's head is less likely to come into contact with the surrounding structure (e.g., dashboard, etc., within the vehicle), thus achieving suitable occupant protection.

Furthermore, in the occupant protection system described above, the restraining device may further include a leg airbag provided on the seat and inflated to press a leg of the occupant located on the seat back against the seat cushion; and when collision of the vehicle is detected or determination is made that the collision is inevitable when the seat back is in the inclined state, the control unit may inflate the leg airbag along with the shoulder airbag. Such a configuration can prevent the occupant's body from lifting due to inertial forces. When the shoulder of the occupant is restrained by the shoulder airbag, in particular, the occupant can be more stably restrained by restraining the occupant also on the leg side.

Moreover, in the occupant protection system described above, the restraining device may be a holding net arranged in a ceiling of the vehicle; and when collision of the vehicle is detected or determination is made that the collision is inevitable when the seat back is in the inclined state, the control unit may release the holding net toward the occupant located on the seat to restrain the occupant with respect to the seat. The slipping of the occupant due to the seat back in the inclined state can be suppressed also by restraining the movement of the occupant's body in such a restraining form, and thus the occupant can be effectively protected against inertial forces.

Advantageous Effects of Invention

According to the present disclosure, the occupant can be suitably protected even when the occupant is seated in the vehicle with the seat inclined and facing a direction different from the advancing direction of the vehicle.

DESCRIPTION OF EMBODIMENTS

Hereinafter, aspects of an occupant protection system according to an embodiment will be hereinafter described with reference to the drawings. Note that each of the configurations, combinations thereof, and the like in each embodiment is an example, and additions, omissions, substitutions, and other changes of the configuration may be made as appropriate without departing from the spirit of the present invention. Note that, configurations of the following embodiments are provided as examples, and the present disclosure is not limited to these embodiments and is to be limited only by the accompanying Claims. Furthermore, each of the embodiments disclosed in the present specification can be combined with any other features disclosed herein.

First Embodiment

Figure 1:
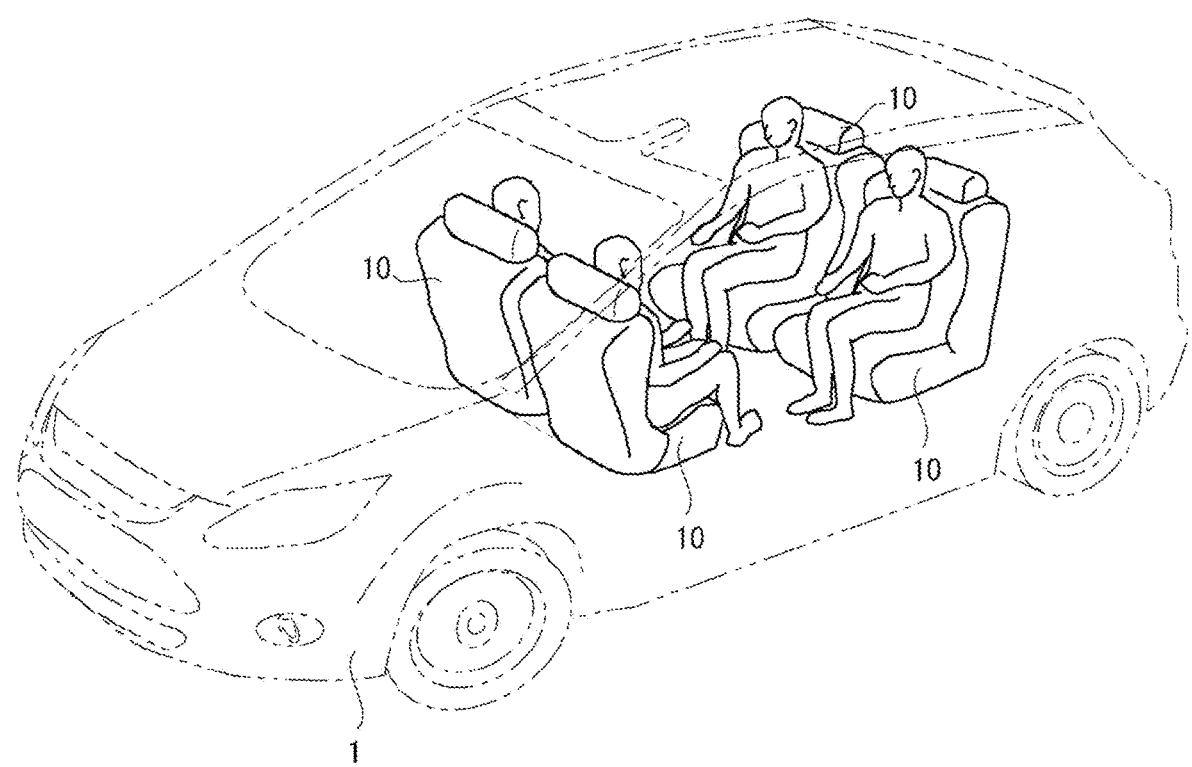
FIG. 1 is a first diagram illustrating a seated state of an occupant boarded on a vehicle.

An occupant protection system according to a first embodiment will be described. The occupant protection system is mounted on a vehicle 1 capable of so-called automatic driving. As the vehicle 1 is capable of automatic driving, a specific person of the occupant does not need to be the operator of the vehicle 1. Thus, for example, as illustrated in FIG. 1, it can be mounted on the vehicle 1 in a state in which a plurality of occupants are seated on respective seats 10 while facing each other. At this time, the vehicle 1 is automatically maneuvered by a traveling control unit 4, which will be described later, and is traveling in a predetermined advancing direction. Note that in FIG. 1, four occupants are boarded on the vehicle 1, and two occupants in the front row are facing the rear side along with the respective seats 10, thereby forming a seated state in which four occupants face each other.

Figure 2:
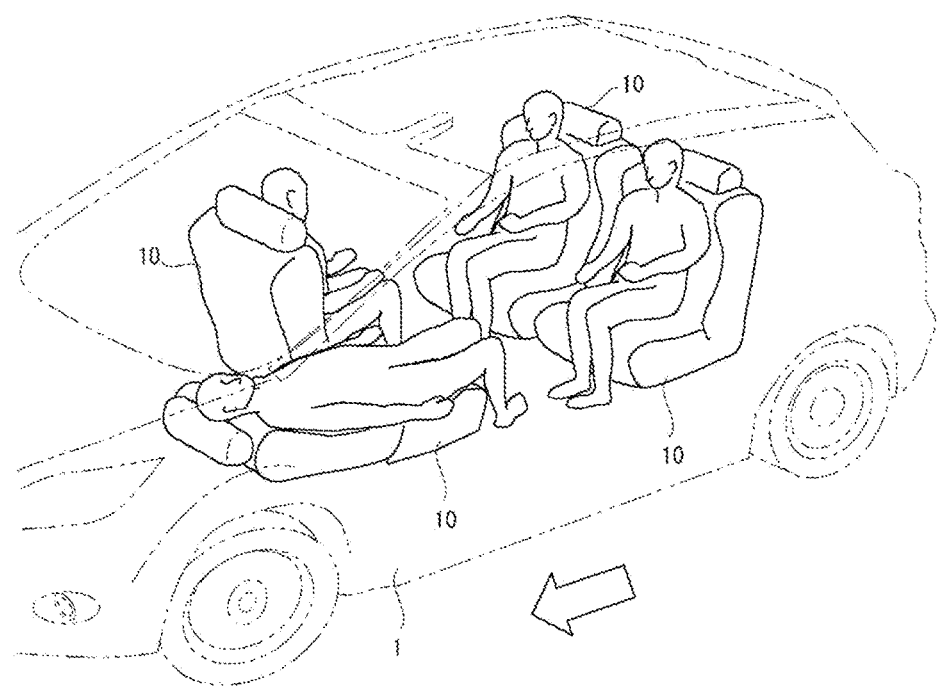
FIG. 2 is a second diagram illustrating a seated state of an occupant boarded on a vehicle.
Figure 3:
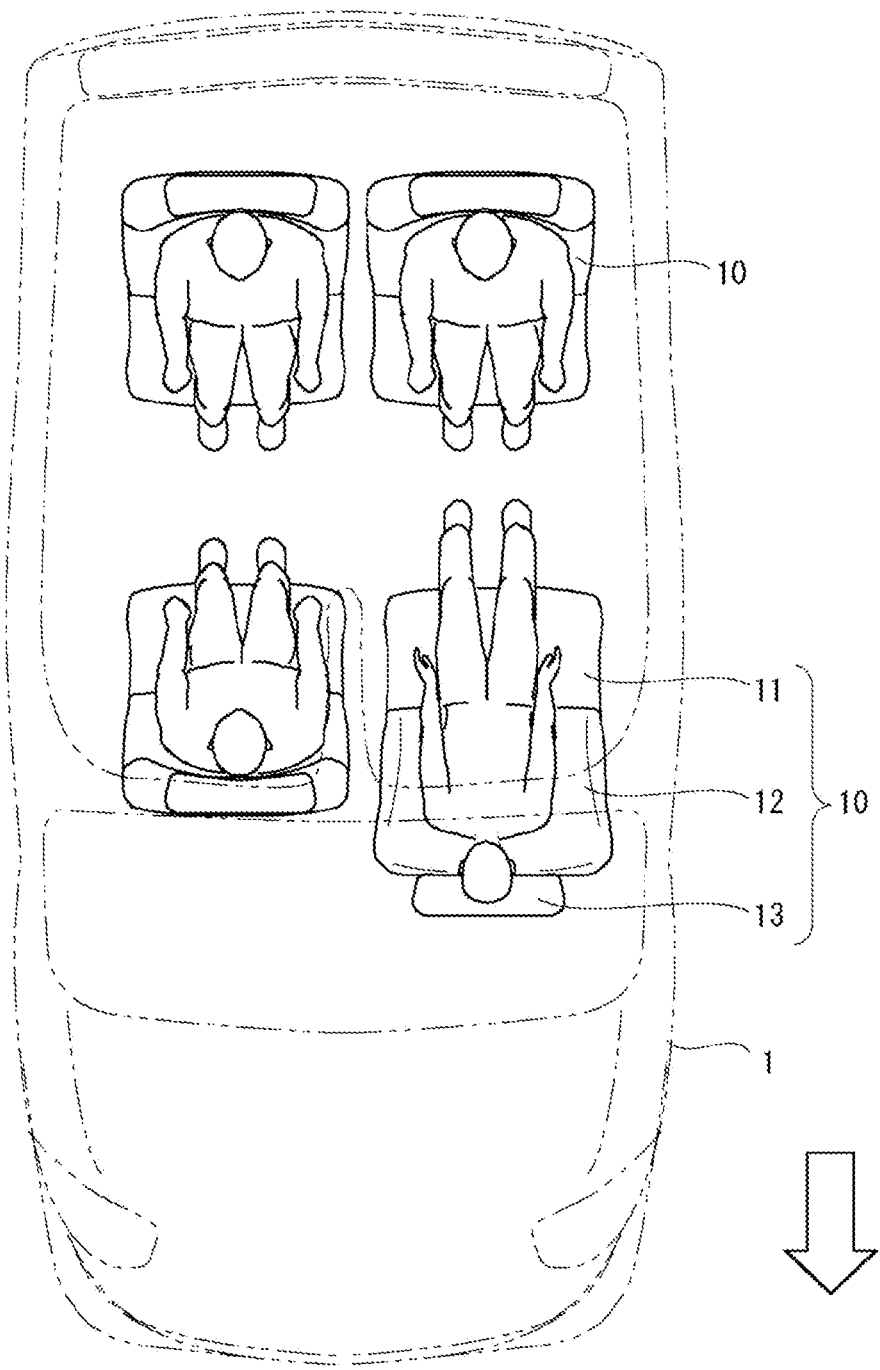
FIG. 3 is a view of the seated state illustrated in FIG. 2 seen from above.
Figure 4:
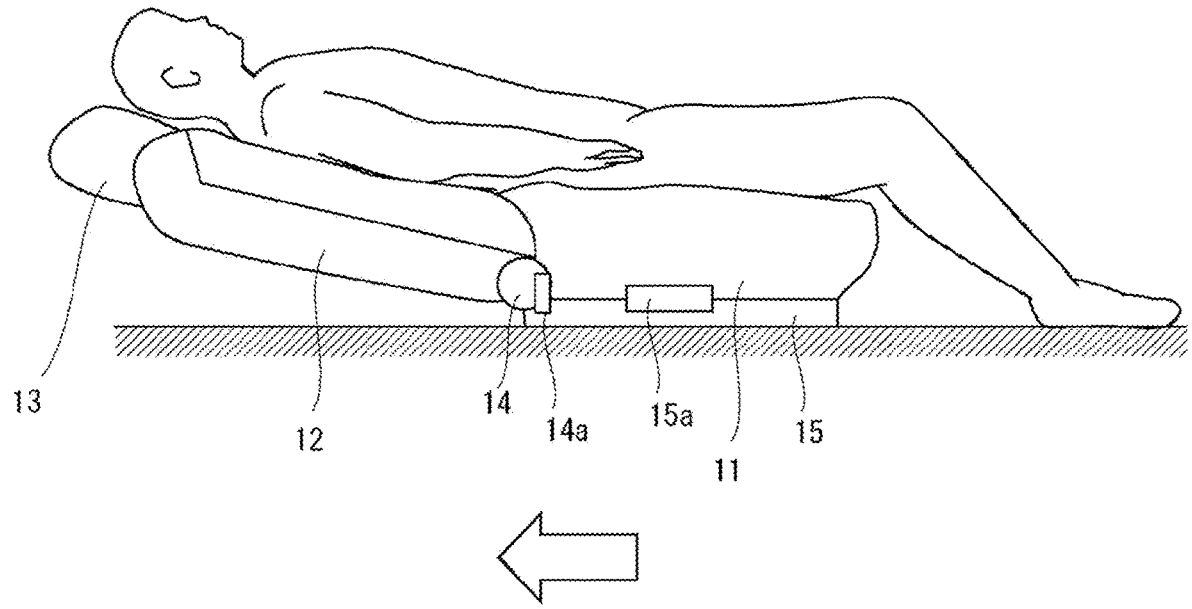
FIG. 4 is a view illustrating a state in which an occupant is seated with a seat back inclined.

Here, each of the seats 10 mounted on the vehicle 1 is configured to be inclinable at a freely selectable angle. Then, FIG. 2 illustrates a state in which the seat 10 on which one occupant in the front row is seated is inclined from the seated state illustrated in FIG. 1, and FIG. 3 illustrates a state in which the seated state illustrated in FIG. 2 is viewed from above. FIG. 4 also illustrates, in a side view, a state of an occupant lying on the inclined seat 10. The white arrow in these figures indicates the advancing direction of the vehicle 1. Specifically, the seat 10 is configured such that a seat back 12 is inclinable (reclinable) at a rotation shaft 14 relative to a seat cushion 11 on which the occupant is seated. Further, a rotating pedestal 15 is attached below the seat cushion 11, and the seat cushion 11 is rotatable with respect to the rotating pedestal 15 fixed to the vehicle floor. As such, the occupant can freely change the orientation of the seat 10 on which oneself is seated, by rotating the seat cushion 11 relative to the rotating pedestal 15.

A headrest 13 is connected to the seat back 12. In the inclined state shown in FIG. 4, the occupant is in a state in which one's own head is placed on the headrest 13 and the majority of the body is further placed on the seat back 12 and the seat cushion 11. Further, in the seat 10, a sensor 14a that detects the inclined angle (rotation angle of the rotation shaft 14) of the seat back 12 with respect to the seat cushion 11, and a sensor 15a that detects the rotation angle of the seat cushion 11 with respect to the rotating pedestal 15, that is, the orientation of the seat 10 are provided.

Figure 5A:
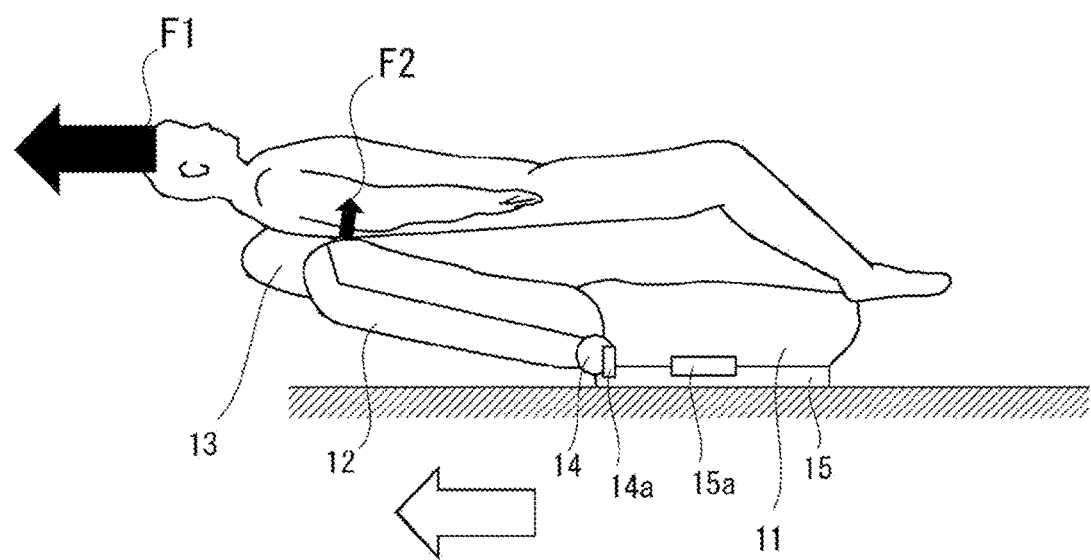
FIG. 5A is a first view for explaining a mechanism of occupant protection by an occupant protection system according to a first form.

Here, as illustrated in FIGS. 2 to 4 in the vehicle 1, when an occupant is seated on the seat 10 with the seat back 12 inclined in a state in which the seat 10 is facing the direction (rear side) opposite to the advancing direction (front side) of the vehicle 1, an inertial force will be generated with respect to occupant if the vehicle 1 collides with an obstacle present on the exterior of the vehicle. For example, as illustrated in FIG. 5A, in a case where the vehicle 1 is advancing in the direction of the white arrow, the inertial force acts on the occupant as an inertial force F1 indicated by a black solid arrow at the time of collision on the front side of the vehicle. At this time, when the seat back 12 is inclined with respect to the seat cushion 11 at a predetermined angle or greater, the extending direction of the occupant's body seated on the seat 10 is close to the advancing direction of the vehicle 1, whereby a supporting force F2 received by the back of the occupant from the seat back 12 is reduced. As a result, the back of the occupant is not sufficiently supported by the seat back 12 against the inertial force F1, and the occupant's body may slide and move on the seat 10, which is not preferable from the view point of the occupant protection.

Thus, the occupant protection system of the present embodiment is configured to perform a support control for suitably protecting an occupant even in a state in which the occupant is using the seat 10 in an inclined manner while facing the direction opposite to the advancing direction of the vehicle 1. The form of occupant protection by the occupant protection system will now be described in detail based on FIG. 5B.

Here, in the seat 10, the seat back 12 includes a base portion 12a that is rotatably connected to the seat cushion 11 through the rotation shaft 14, and a movable portion 12b configured to rise with respect to the base portion 12a. The movable portion 12b is rotatably connected to the base portion 12a in the vicinity of the rotation shaft 14, and a surface of the movable portion 12b provides a surface that comes into contact with the back of the occupant. Between the base portion 12a and the movable portion 12b, an airbag 20 is disposed that inflates by gas generated through combustion of a gas generating agent in a gas generator 17 disposed inside the seat cushion 11. As the gas generating agent, for example, that having a single-perforated cylindrical shape consisting of guanidine nitrate (41 wt. %), basic copper nitrate (49 wt. %), and a binder or an additive can be used. Furthermore, a known hybrid type in which a pressurized gas and a gas generating agent are used in combination, or a known storage type that uses only the pressurized gas also can be used for the gas generator 17.

The gas generator 17 is connected to the airbag 20 through a gas flow path 18. Before the gas generator 17 is actuated, that is, when there is no need to protect the occupant on the seat 10, the airbag 20 is accommodated between the base portion 12a and the movable portion 12b in a folded state, as shown in FIG. 5A. When the gas generator 17 is actuated, gas generated therein is fed into and inflates the airbag 20. With the inflation force as a power source, the movable portion 12b rotates to rise with respect to the base portion 12a. Further, the gas flow path 18 is provided with an adjustment valve 19 for adjusting the flow rate of the gas flowing through the gas flow path 18 and supplied to the airbag 20. By adjusting the flow rate of the gas flowing through the gas flow path 18, the degree of inflation of the airbag 20 can be adjusted, and furthermore, the speed of rising of the movable portion 12b with respect to the base portion 12a can be adjusted.

Furthermore, in the seat back 12, a damper device 16 is disposed near the headrest 13 between the base portion 12a and the movable portion 12b to reduce the relative speed between the base portion 12a and the movable portion 12b when the airbag 20 is inflated by the actuation of the gas generator 17. Note that, before the gas generator 17 is actuated, the damper device 16 is housed between the base portion 12a and the movable portion 12b as illustrated in FIG. 5B.

In the seat 10 configured in this manner, when the possibility of the vehicle 1 colliding with an external obstacle increases while the occupant is utilizing the seat 10 in an inclined manner and facing opposite to the advancing direction of the vehicle 1, the gas generator 17 is actuated to inflate the airbag 20, whereby a support control is performed to form a predetermined upright posture of the seat 10 in which the movable portion 12b is raised with respect to the base portion 12a. A state in which the seat 10 is in a predetermined upright posture is illustrated in FIG. 5B. At this time, the relative position relationship between the base portion 12a and the seat cushion 11, that is, the inclined angle of the rotation shaft 14 remains maintained. When the seat 10 is in a predetermined upright posture, the extending direction of the occupant's body on the seat 10 is different from the advancing direction of the vehicle 1, and thus through the movable portion 12b the occupant can more easily resist the inertial force F1 during the collision. Thus, forming a predetermined upright posture when the possibility of a collision between the vehicle 1 and the obstacle is increased in this way, means completing, before the collision occurs, preparation for a larger supporting force F3 acting on the back of the occupant by the raised movable portion 12b of the seat back 12. Thus, even if the vehicle 1 and the obstacle collide, the sufficient supporting force F3 can reliably act on the occupant through the movable portion 12b to resist the inertial force F1 at that time, and thus the protection of the occupant can be suitably realized. In addition, a sensor that detects the weight of the occupant in any portion of the seat 10 (e.g., the seat cushion 11) may be arranged, and the raised height of the seat back 12 (movable portion 12b) may be adjusted based on the detected weight to generate the supporting force F3 of an appropriate magnitude in consideration of the occupant's weight. For example, as the weight of the occupant becomes greater, the raised angle is increased to have the seat back 12 more closer to the upright state.

Figure 5B:
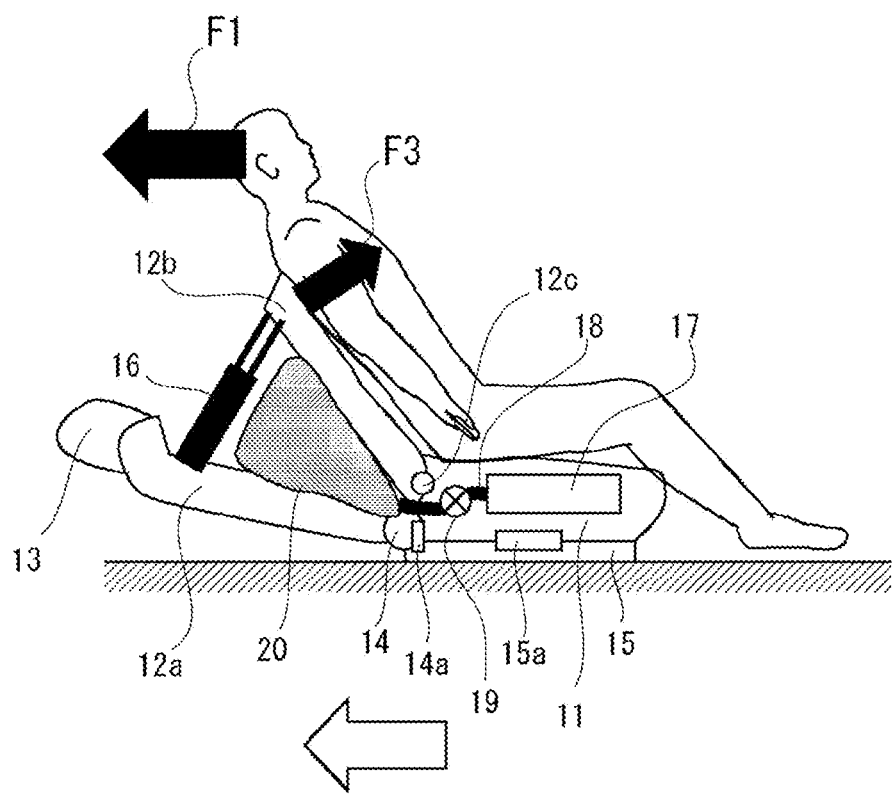
FIG. 5B is a first view for explaining the mechanism of occupant protection by the occupant protection system according to the first form.

Note that the damper device 16 is disposed between the base portion 12a and the movable portion 12b as illustrated in FIG. 5B, and rapid movement of the movable portion 12b when the gas generator 17 is actuated as described above can be reduced. This is not to impose a sudden change in body posture on the body of the occupant located on the seat 10 in forming a predetermined upright posture. Furthermore, the headrest 13 may be configured to connect to the movable portion 12b side, thus raising the movable portion 12b while supporting the head of the occupant to form a predetermined upright posture to reduce the burden on the neck of the occupant.

Figure 6:
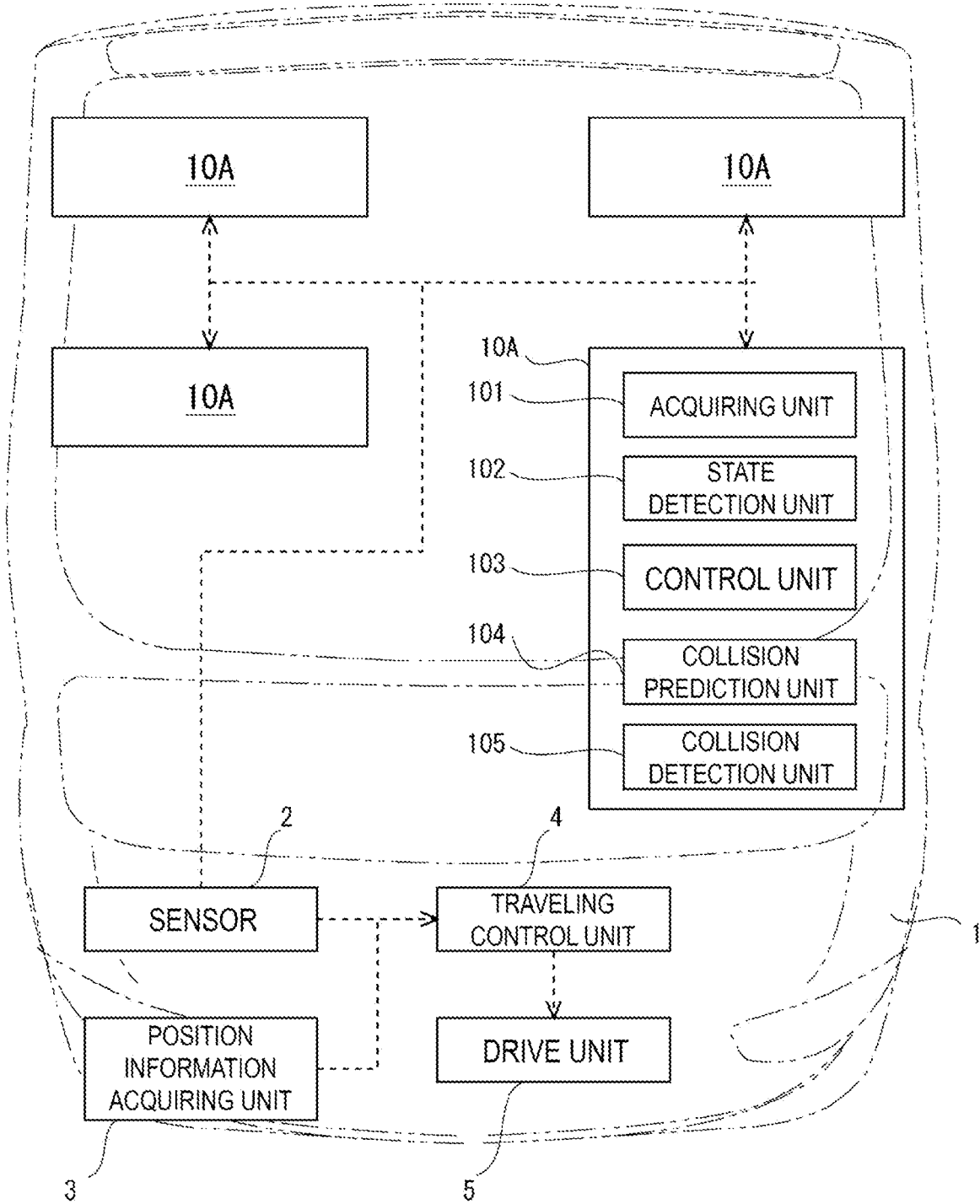
FIG. 6 is a diagram illustrating a functional block associated with the occupant protection system installed on a vehicle.

Details of the support control for protection of an occupant by the occupant protection system described above will now be described based on FIGS. 6 and 7. FIG. 6 is a functional block diagram for support control formed in a control device 10A provided in each seat 10 as an occupant protection system. Since four seats 10 are arranged in the vehicle 1, four control devices 10A are illustrated in FIG. 6, where the functional units thereof are representatively illustrated for one of the control devices 10A. Each control device 10A is configured, for example, by a microcomputer, and each function is realized by causing a central processing unit (CPU) (not shown) to execute a program stored in a storage means (read only memory (ROM) or the like (not shown)).

Furthermore, in FIG. 6, a sensor 2, a position information acquiring unit 3, the traveling control unit 4, and a drive unit 5 for configuring the vehicle 1 to be automatically drivable are also illustrated. First, a configuration associated with these vehicles 1 will be described. The vehicle 1 travels on the road in an appropriate manner as autonomous traveling while sensing its periphery. The sensor 2 is a means for performing sensing of the periphery of the vehicle 1 to acquire information necessary for autonomous traveling of the vehicle 1, and is typically configured to include stereo camera, laser scanner, LIDAR, radar, or the like. The information acquired by the sensor 2 is transmitted to the traveling control unit 4, and is used by the traveling control unit 4 for recognition of obstacles and traveling lanes present at the periphery of the vehicle 1. In the present embodiment, the sensor 2 may include a visible light camera for monitoring. The position information acquiring unit 3 is a means for acquiring the current position of the vehicle 1, and is typically configured to include a GPS receiver or the like. The information acquired by the position information acquiring unit 3 is also transmitted to the traveling control unit 4, for example, and is used for predetermined processing, such as calculation of a route for the vehicle 1 to reach the destination using the current position of the vehicle 1, calculation of the required time required to reach the destination, and the like.

The traveling control unit 4 is a computer configured to control the vehicle 1 on the basis of information acquired from the sensor 2 and the position information acquiring unit 3. The traveling control unit 4 is configured, for example, by a microcomputer, and functions for performing the various processes described above are realized by causing a central processing unit (CPU) (not shown) to execute a program stored in a storage means (read only memory (ROM) or the like (not shown)).

As specific examples of various processes by the traveling control unit 4, a generation process of the travel plan of the vehicle 1; a detection process of the predetermined data of the periphery of the vehicle 1 necessary for autonomous traveling based on the data acquired by the sensor 2; a generation process of control command for controlling autonomous travel based on the travel plan, the predetermined data, and the position information of the vehicle 1 acquired by the position information acquiring unit 3; and the like. The generation process of the travel plan is a process for determining a travel path for reaching a destination from the departure place. Further, the detection process of the predetermined data is, for example, a process for detecting the number and position of lanes, the number and position of vehicles present in the periphery of the host vehicle, the number and position of obstacles present in the periphery of the host vehicle (e.g., pedestrians, bicycles, structures, buildings, and the like), the structure of the road, the road sign, and the like. The control command is transmitted to the drive unit 5, which will be described later. A known method can be adopted for a method for generating a control command for autonomous traveling of the vehicle 1.

The drive unit 5 is a means for traveling the vehicle 1 on the basis of the control command generated by the traveling control unit 4. The drive unit 5 is configured, for example, by including a motor, an inverter, a brake, a steering mechanism, and the like for driving a wheel, and autonomous traveling of the vehicle 1 is realized by driving the motor, the brake, or the like in accordance with a control command.

Now, each functional unit of the control device 10A will be described. The control device 10A includes an acquiring unit 101, a state detection unit 102, a control unit 103, a collision prediction unit 104, and a collision detection unit 105. First, the acquiring unit 101 is a functional unit for acquiring environment information related to the vehicle 1 in traveling or the surrounding environment of the vehicle 1. The environment information is information related to a collision between the vehicle 1 and an obstacle present at the periphery thereof, and examples thereof include, for example, information related to traveling and steering of the vehicle 1, relative position information of the obstacle with respect to the vehicle 1, relative speed information, information related to the distance between the vehicle 1 and the obstacle, and the like. The acquiring unit 101 acquires the environment information using the data acquired by the sensor 2. Note that the predetermined data for autonomous traveling of the vehicle 1 does not necessarily match the environment information. Next, the state detection unit 102 is a functional unit for detecting the state of the seat 10 on which the occupant is seated, and specifically detects the rotation angle of the rotation shaft 14 for inclination of the seat back 12 by the sensor 14a and the rotation angle of the seat cushion 11 by the sensor 15a as a state of the seat 10. Furthermore, the state detection unit 102 detects the weight of the occupant seated in the seat 10 as the state of the seat 10.

Next, the control unit 103 is a functional unit configured to execute the support control described on the basis of FIG. 5B. The control unit 103 executes the support control to resist an inertial force (inertial force F1 illustrated in FIGS. 5A and 5B) that is assumed to act on the occupant when the vehicle 1 collides with an obstacle in consideration of the rotation angle of the rotation shaft 14 detected by the state detection unit 102 and the rotation angle of the seat cushion 11. The support control is a process for forming a predetermined upright posture of the seat 10 by actuating the gas generator 17 as described above.

Additionally, the collision prediction unit 104 is a functional unit that predicts a collision between the vehicle 1 and the obstacle. Specifically, the possibility of a collision is predicted based on the speed information of the vehicle 1, the separation distance between the obstacle and the vehicle 1, and the like serving as the environment information acquired by the acquiring unit 101. For example, it can be predicted that the possibility of a collision is higher as the time to collision is shorter, calculated from the speed and the separation distance of the vehicle 1. The collision detection unit 105 is a functional unit configured to detect a collision between the vehicle 1 and the obstacle or to determine that the collision is inevitable. In other words, the collision detection unit 105 is a functional unit that detects an actual collision or a state in which a collision may occur with a relatively high probability. The collision detection unit 105 can detect a collision with an obstacle using a detection value of an acceleration sensor or a pressure sensor provided at a plurality of areas in the vehicle 1.

Figure 7:
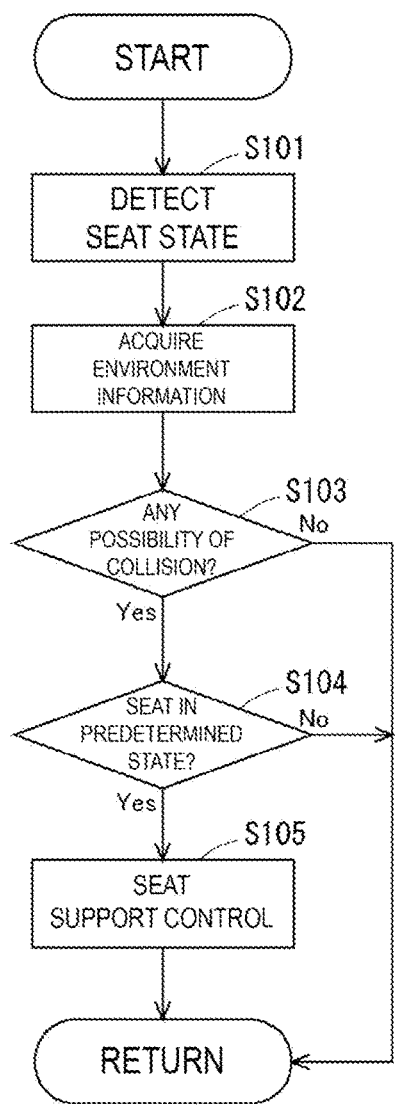
FIG. 7 is a first flow chart associated with a support control for occupant protection executed in the occupant protection system.

Here, the details of the support control will be described based on FIG. 7. Note that the support control is repeatedly executed at predetermined intervals by the control device 10A. First, in S101, the rotation angle of the rotation shaft 14, the rotation angle of the seat cushion 11, and the weight of the occupant are detected as the state of the seat 10 by the state detection unit 102. Next, in S102, the environment information is acquired by the acquiring unit 101. As described above, the environment information is information related to the collision between the vehicle 1 and the obstacle present at the periphery of the vehicle.

Then, in S103, the collision prediction unit 104 determines whether or not there is a possibility of a collision between the vehicle 1 and the obstacle. For example, if the time to the collision calculated from the speed and the separation distance of the vehicle 1 is shorter than a predetermined threshold value, determination is made that there is a possibility of a collision, and a positive determination is made in S103. The process proceeds to S104 when a positive determination is made in S103, and the support control is terminated when a negative determination is made.

Subsequently, in S104, whether the state of the seat 10 detected by the state detection unit 102 is in a predetermined state is determined. The predetermined state is a state in which the seat 10 is facing opposite to the advancing direction of the vehicle 1, and the inclined state of the seat 10 is a state in which insufficient support of the occupant described on the basis of FIG. 5A may occur, that is, a state in which the inclined angle is greater than or equal to a predetermined angle. The former can be detected by the sensor 14a and the latter can be detected by the sensor 15a. The process proceeds to S105 when a positive determination is made in S104, and the support control is terminated when a negative determination is made.

In S105, the support control is executed by the control unit 103. That is, although there is no collision yet between the vehicle 1 and the obstacle at the present time, the seat 10 may be formed to a predetermined upright posture in advance (posture of the seat 10 shown in FIG. 5B) to resist the inertial force F1 assumed in the collision in view of the determination result from S103, that is, the determination result that the possibility of a collision with the obstacle is high. A more suitable protection of the occupant can be achieved by forming a posture that resists the inertial force F1 before the collision in this way.

Note that even in a case where determination is made that there is a possibility of a collision in S103, the raising angle of the movable portion 12b may be adjusted in accordance with the extent of possibility. For example, even in a case where there is a possibility of a collision, the raising angle of the movable portion 12b with respect to the base portion 12a is reduced when the distance between the vehicle 1 and the obstacle is relatively long, and the raising angle of the movable portion 12b is increased as the distance becomes shorter, whereby the seat 10 may eventually be brought closer to the predetermined upright posture. Since no excessive change in body posture is imposed on the occupant even to prepare for a collision in advance by adjusting the raising angle in this way, the convenience of the occupant protection system can be enhanced. Note that the degree of opening of the adjustment valve 19 is adjusted to adjust the degree of inflation of the airbag 20, thereby adjusting the raising angle of the movable portion 12b. The gas flow path 18 is formed to discharge the remaining gas to the outside of the airbag 20 through the adjustment valve 19 when a part of the gas generated by the gas generator 17 is supplied to the airbag 20.

Regarding the supply of gas to the airbag 20 by the adjustment valve 19, the supply amount per unit time of the gas may be controlled to avoid the airbag 20 from being suddenly inflated and imposing a sudden change in body posture on the occupant. In other words, in the initial stage of raising the movable portion 12b, the supply amount of gas is made relatively small to reduce the relative speed of the movable portion 12b with respect to the base portion 12a. Thereafter, the supply amount of gas may be increased to increase the relative speed of the movable portion 12b.

Furthermore, as an alternative method of a power source for having the seat 10 in a predetermined upright posture, an electrical means, for example, an electric motor or a solenoid, may be used instead of the gas generated by the gas generator 17. The electric motor may be configured to rotate the movable portion 12b with respect to the base portion 12a, or the output shaft of the electric motor may be connected to the rotation shaft 14 to configure the seat back 12 itself to rotate relative to the seat cushion 11. Such a configuration can form a predetermined upright posture in the support control.

First Modified Example

Figure 8A:
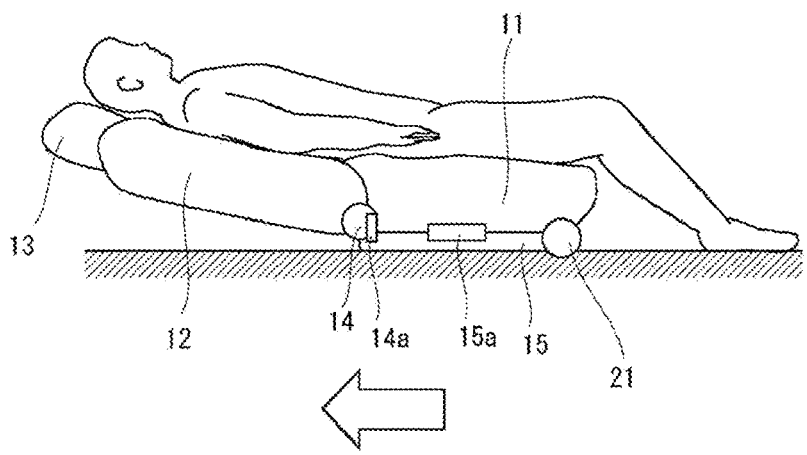
FIG. 8A is a second view for explaining a mechanism of occupant protection by the occupant protection system.
Figure 8B:
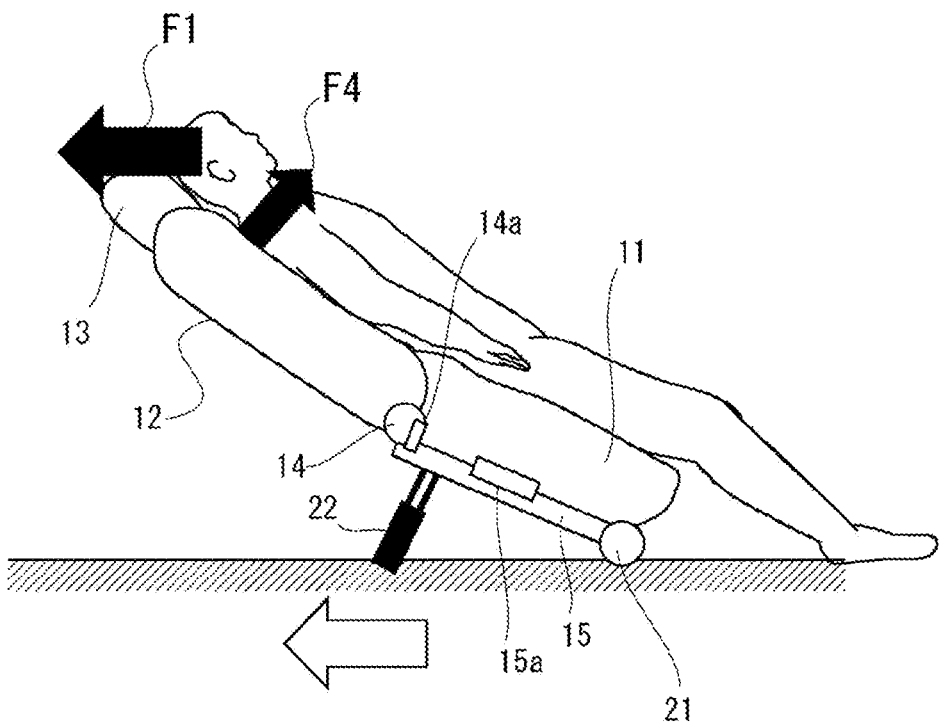
FIG. 8B is a second view for explaining a mechanism of occupant protection by the occupant protection system.

A modified example of the support control, in particular, another form for forming a predetermined upright posture of the seat 10, will be described based on FIGS. 8A and 8B. In the seat 10 of the present modified example, one end of the rotating pedestal 15 is connected through a hinge portion 21 to be able to turn with respect to the vehicle floor. Moreover, in the pre-actuated state, as illustrated in FIG. 8A, a lift device 22 (see FIG. 8B) is housed between the rotating pedestal 15 and the vehicle floor.

In the seat 10 configured in this manner, when a possibility that the vehicle 1 will collide with an external obstacle increases while the occupant is utilizing the seat 10 in an inclined manner and facing opposite to the advancing direction of the vehicle 1, the lift device 22 is actuated. As a result, the entire seat 10 is inclined with respect to the vehicle floor with the hinge portion 21 as a reference while maintaining the inclined state of the seat back 12 with respect to the seat cushion 11, and the support control is performed to form a predetermined upright posture of the seat 10. The state in which the predetermined upright posture is formed is illustrated in FIG. 8B.

Even when the seat 10 is in a predetermined upright posture as in the present modified example, a state in which the extending direction of the occupant's body on the seat 10 is different from the advancing direction of the vehicle 1 is formed by greatly raising the head side of the seat 10 than the foot side of the seat 10, and hence the occupant can more easily resist the inertial force F1 during the collision through the seat back 12. Thus, forming a predetermined upright posture when the possibility of a collision between the vehicle 1 and the obstacle is increased in this way, means completing, before the collision occurs, preparation for a larger supporting force F4 acting on the back of the occupant by the raised seat back 12. Thus, even if the vehicle 1 and the obstacle collide, the sufficient supporting force F4 can reliably act on the occupant through the seat back 12 to resist the inertial force F1 at that time, and thus the protection of the occupant can be suitably realized.

Second Embodiment

Figure 9A:
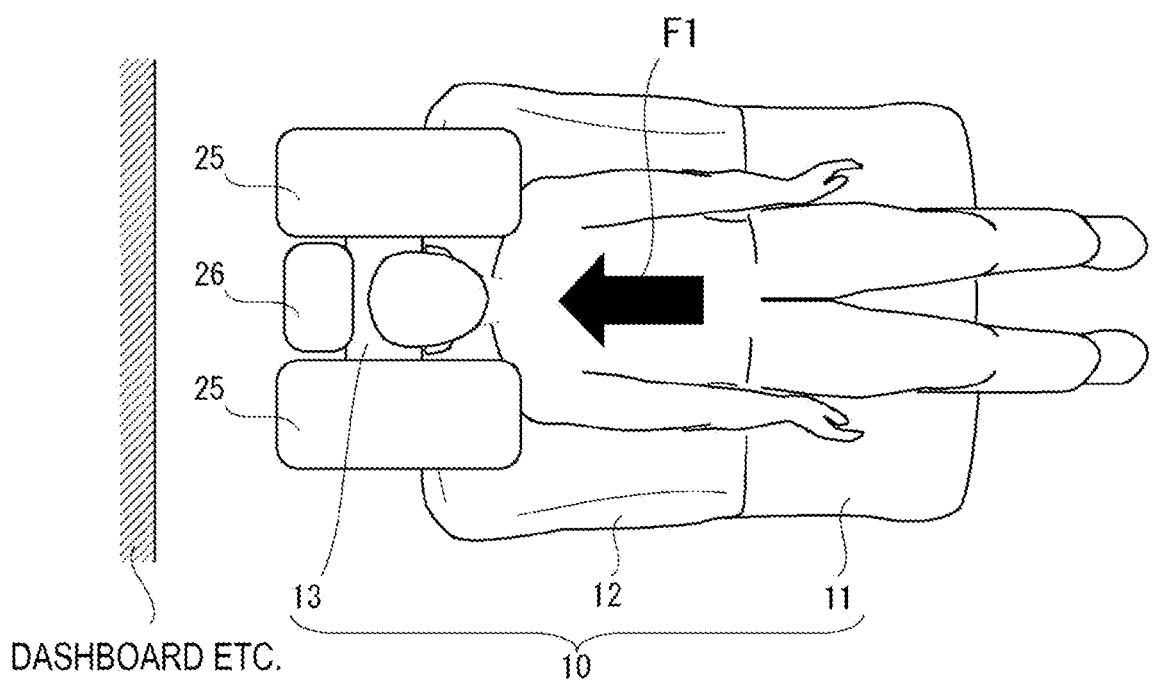
FIG. 9A is a view illustrating an occupant protection system according to a second form.
Figure 9B:
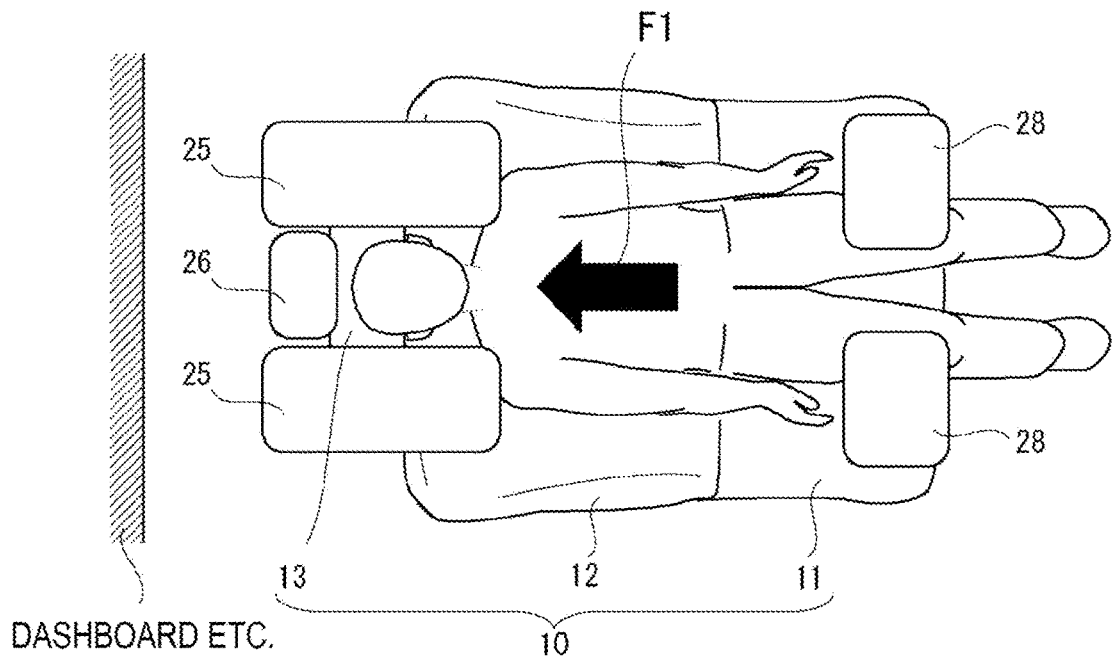
FIG. 9B is a view illustrating the occupant protection system according to the second form.

An occupant protection system according to a second embodiment will be described based on FIGS. 9A and 9B as well as FIGS. 10A and 10B. The occupant protection system of the present embodiment is a system for protecting an occupant when the vehicle 1 collides with an obstacle. First, in the form illustrated in FIG. 9A, two shoulder airbags 25 are arranged to correspond to both shoulders of an occupant, respectively, at an upper end of the seat back 12 of the seat 10, close to an area where the shoulders of the occupant are assumed to be located when the occupant is seated on the seat 10. Note that FIGS. 9A and 9B illustrate a state in which the shoulder airbag 25 and a head airbag 26 and a leg airbag 28 described below are inflated. The size of the shoulder airbag 25 when inflated (size along the advancing direction of the vehicle 1) is set to be sufficiently larger than the size of the occupant's head. Note that a gas generator that generates gas for inflating these airbags is disposed in the seat 10, but the illustration thereof is omitted in FIGS. 9A and 9B. Further, the head airbag 26 is disposed at the end of the headrest 13, near an area where the head of the occupant is assumed to be located when the occupant is seated on the seat 10. The head airbag 26 is located between the two shoulder airbags 25.

In the seat 10 configured in this manner, when the vehicle 1 collides with an external obstacle while the occupant is utilizing the seat 10 in an inclined manner facing opposite to the advancing direction of the vehicle 1, the gas generator (not shown) is actuated to inflate the shoulder airbags 25 and the head airbag 26. At this time, the shoulder airbag 25 abuts against both shoulders of the occupant to limit slipping of the occupant's body to resist the inertial force F1 generated at the time of collision. Furthermore, as the shoulder airbag 25 is sufficiently large with respect to the occupant's head and the head airbag 26 is also installed, contact with a structure such as a dashboard of the vehicle 1 present near the head of the occupant can be sufficiently avoided, and a suitable protection of the occupant can be achieved.

Next, in the form illustrated in FIG. 9B, two of the leg airbags 28 are arranged to correspond to the legs of an occupant, respectively, at a lower end of the seat cushion 11 of the seat 10, close to an area where the legs of the occupant are assumed to be located when the occupant is seated on the seat 10. The leg airbag 28 is deployed from the outer side to hold the leg of the occupant from above. In the seat 10 configured in this manner, when the vehicle 1 collides with an external obstacle while the occupant is utilizing the seat 10 in an inclined manner and facing opposite to the advancing direction of the vehicle 1, the gas generator (not shown) is actuated to inflate the leg airbags 28 in addition to the shoulder airbags 25 and the head airbag 26. When the leg airbags 28 are inflated, the legs of the occupant are pressed against the seat cushion 11. Without the leg airbag 28, the inertial force F1 at the time of collision may act on the legs of the occupant and cause the occupant's body to be raised, nevertheless a more suitable protection of the occupant can be achieved by also utilizing the leg airbag 28.

Figure 10A:
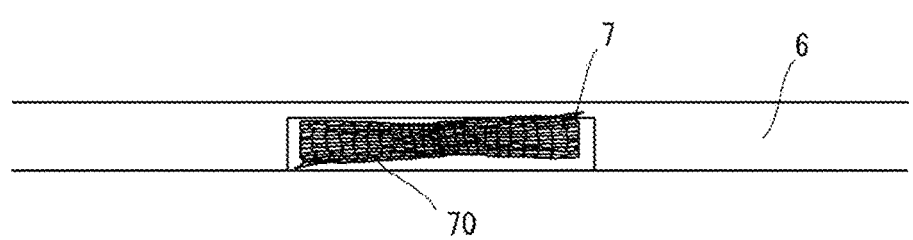
FIG. 10A is a view illustrating an occupant protection system according to a third form.
Figure 10A:
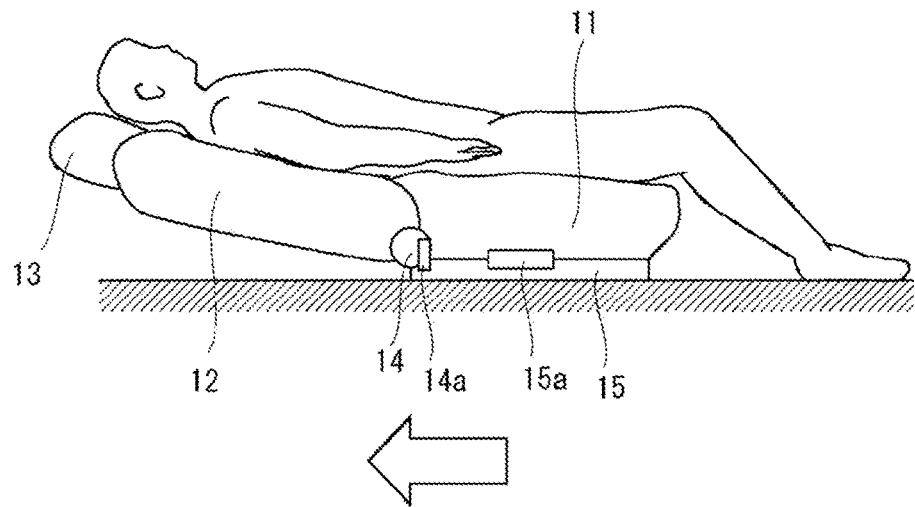
Figure 10B:
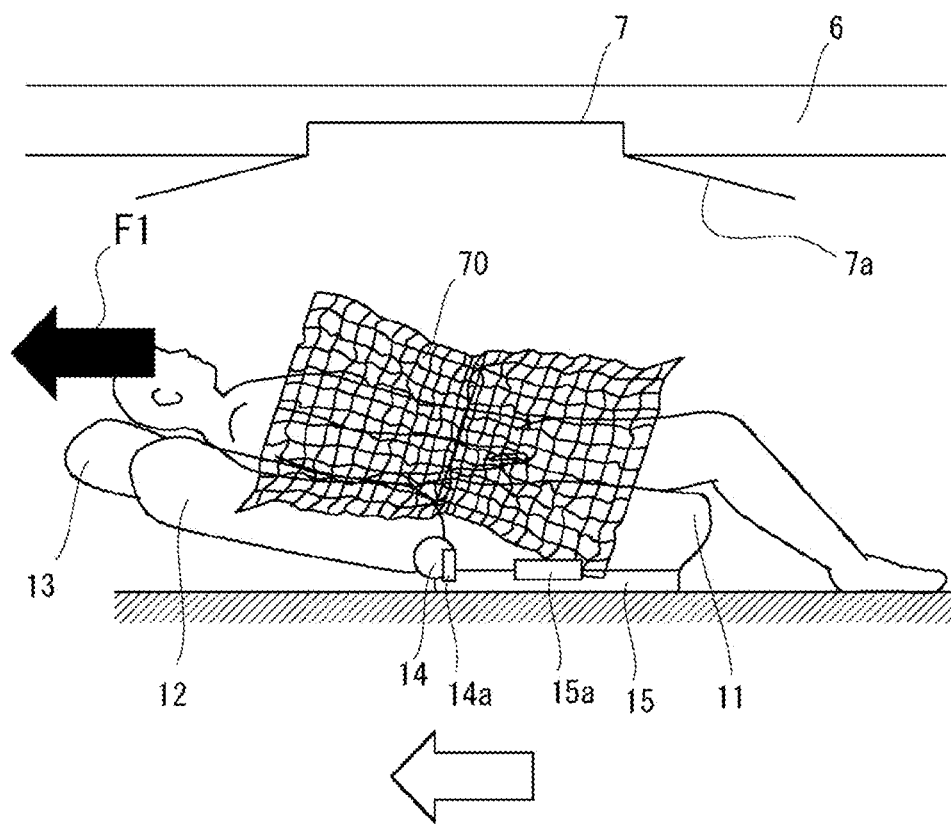
FIG. 10B is a view illustrating the occupant protection system according to the third form.

Next, in the form illustrated in FIGS. 10A and 10B, a release device 7 is provided inside a ceiling 6 of the vehicle 1 in which the seat 10 is arranged, the release device 7 being configured to release a restraint net 70 formed by a stretchable member and having a relatively strong adhesiveness on the surface thereof. Prior to actuation of the release device 7, the restraint net 70 is accommodated within the device, as shown in FIG. 10A. Then, when the vehicle 1 collides with an external obstacle while the occupant is utilizing the seat 10 in an inclined manner and facing opposite to the advancing direction of the vehicle 1, a release door 7a of the release device 7 opens and the restraint net 70 is released to the occupant positioned therebelow, thus suitably restraining the occupant with respect to the seat 10.

When such release of the restraint net 70 occurs, the occupant is lying on the seat 10 since the seat 10 is in an inclined state. Thus, the restraint net 70 released from the ceiling 6 can broadly catch the occupant's body and can achieve effective restraint of the occupant. The release device 7 can be provided on the ceiling 6 corresponding to each of the seats 10 in the vehicle 1.

Furthermore, as a modified example, a larger restraint net may be provided in the ceiling 6, and thus all of the occupants seated on all the seats 10 present in the vehicle 1 can be restrained with one restraint net. In such a case, the larger restraint net can be released to restrain all the occupants if the occupant is utilizing the seat 10 in an inclined manner and facing opposite to the advancing direction of the vehicle 1 in at least one seat 10 of all the seats 10 in the vehicle 1.

Figure 11:
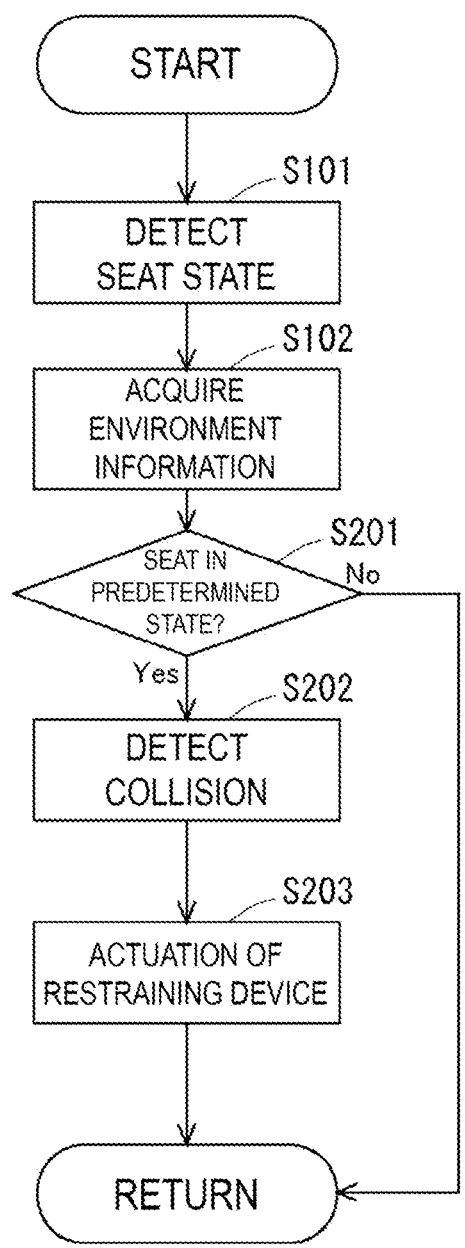
FIG. 11 is a second flow chart associated with a support control for occupant protection executed in the occupant protection system.

Here, the details of the support control of the present embodiment will be described based on FIG. 11. Note that this support control is also repeatedly executed at predetermined intervals by the control device 10A. Note that if the same processes are performed in the support control illustrated in FIG. 7 and the support control of the present embodiment, the same reference numerals are denoted and detailed descriptions thereof will be omitted. In the support control of the present embodiment, when the process of S102 is terminated, the process proceeds to S201. In S201, whether the state of the seat 10 detected by the state detection unit 102 is the predetermined state described above is determined. Note that the determination process of S201 is substantially the same as the determination process of S104 described above. The process proceeds to S202 when a positive determination is made in S201, and the support control is terminated when a negative determination is made.

In S202, a collision between the vehicle 1 and the obstacle is detected by the collision detection unit 105. Thereafter, in S203, the control unit 103 activates the restraining device (such as the shoulder airbag 25) illustrated in FIGS. 9A and 9B and the release device 7 that accommodates the restraint net 70 illustrated in FIGS. 10A and 10B. In other words, in the present embodiment, the inflation of the shoulder airbag 25 and the like and the release of the restraint net 70 are executed to resist the inertial force F1 generated by the collision when a collision between the vehicle 1 and the obstacle occurs. This allows for a suitable protection of an occupant. Note that, in the embodiments illustrated in FIGS. 9A and 9B, as well as FIGS. 10A and 10B, when it is determined that the collision with the obstacle is inevitable by the collision detection unit 105, the shoulder airbags 25, the head airbag 26, the leg airbags 28, and the restraint net 70 can be actuated even if it is actually a state before collision.

REFERENCE SIGNS LIST

1: vehicle
10: seat
10A: control device
11: seat cushion
12: seat back
12a: base portion
12b: movable portion
13: headrest
16: damper device
17: gas generator
18: gas flow path
19: adjustment valve
20: airbag
21: hinge portion
22: lift device
25: shoulder airbag
26: head airbag
28: leg airbag
6: ceiling
7: release device
70: restraint net
7a: release door

The invention claimed is:

1. An occupant protection system comprising:
a seat including a seat cushion and a seat back configured to be inclinable with respect to the seat cushion,
an acquiring unit that acquires environment information related to the vehicle in traveling or a surrounding environment of the vehicle; and
a control unit that, when the seat is facing a direction different from an advancing direction of the vehicle and the seat back is in an inclined state with respect to the seat cushion at greater than or equal to a predetermined angle, executes a support control for supporting the occupant in the seat to have a posture of the seat on which the occupant is located in a predetermined upright posture to resist an inertial force that is assumed to act on the occupant boarding on the seat and causes a contact surface that comes into contact with the back of the occupant to rise from the inclined state with respect to the seat cushion to bring the seat closer to the predetermined upright posture, as a distance between the vehicle and an obstacle at a periphery thereof, with which collision is assumed, included in the environment information becomes shorter when collision of the vehicle is predicted, based on the environment information, wherein the seat back comprises a base portion connected to the seat cushion, and a movable portion having a contact surface with the occupant and configured to rise with respect to the base portion, and the control unit causes the movable portion to rise with respect to the base portion to form the predetermined upright posture while maintaining a relative relationship between the base portion and the seat cushion.

2. The occupant protection system according to claim 1, wherein when the seat is facing a direction opposite to the advancing direction of the vehicle and the seat back is in the inclined state, the control unit executes the support control to have a posture of the seat on which the occupant is located in a predetermined upright posture to resist the inertial force that is assumed to act on the occupant boarding on the seat when collision of the vehicle is predicted based on the environment information.

3. The occupant protection system according to claim 1, wherein
the seat comprises a gas generator that generates gas due to combustion of an explosive, and the seat is configured to cause the movable portion to rise with respect to the base portion by the gas supplied from the gas generator; and
the seat back comprises a reducing means that reduces a relative speed of the movable portion with respect to the base portion.

4. The occupant protection system according to claim 3, wherein the reducing means is a damper device.

5. The occupant protection system according to claim 3, wherein the reducing means controls a supply amount of the gas supplied from the gas generator per unit time for raising operation of the movable portion.

6. The occupant protection system according to claim 1, wherein the control unit raises a head side of the seat to a greater degree than a foot side of the seat, while maintaining the inclined state of the seat back with respect to the seat cushion to form the predetermined upright posture.

7. The occupant protection system according to claim 1, wherein
in a case where restraining of the occupant by a restraining device for restraining the occupant located on a seat to the seat is not performed and the seat back is in the inclined state, when collision of the vehicle is detected based on the environment information or determination is made that the collision is inevitable, the control unit executes the restraining of the occupant by the restraining device as the support control to resist the inertial force.

8. An occupant protection system comprising:
a seat including a seat cushion and a seat back configured to be inclinable with respect to the seat cushion,
an acquiring unit that acquires environment information related to the vehicle in traveling or a surrounding environment of the vehicle; and
a control unit that, when the seat is facing a direction different from an advancing direction of the vehicle and the seat back is in an inclined state with respect to the seat cushion at greater than or equal to a predetermined angle, executes a support control for supporting the occupant in the seat to have a posture of the seat on which the occupant is located in a predetermined upright posture to resist an inertial force that is assumed to act on the occupant boarding on the seat and causes a contact surface that comes into contact with the back of the occupant to rise with respect to the seat cushion to bring the seat closer to the predetermined upright posture, as a distance between the vehicle and an obstacle at a periphery thereof, with which collision is assumed, included in the environment information becomes shorter when collision of the vehicle is predicted, based on the environment information, wherein in a case where restraining of the occupant by a restraining device for restraining the occupant located on a seat to the seat is not performed and the seat back is in the inclined state, when collision of the vehicle is detected based on the environment information or determination is made that the collision is inevitable, the control unit executes the restraining of the occupant by the restraining device as the support control to resist the inertial force, the restraining device is a shoulder airbag that is provided on the seat to abut against a shoulder of the occupant located on the seat when inflated, and that has a predetermined inflation size that is greater than a head size of the occupant along the advancing direction of the vehicle when inflated, and the control unit is configured to inflate the shoulder airbag when collision of the vehicle is detected or determination is made that the collision is inevitable and when the seat back is in the inclined state.

9. The occupant protection system according to claim 8, wherein the restraining device further comprises a leg airbag provided on the seat and inflated to press a leg of the occupant located on the seat back against the seat cushion; and when collision of the vehicle is detected or determination is made that the collision is inevitable and when the seat back is in the inclined state, the control unit inflates the leg airbag along with the shoulder airbag.

10. An occupant protection system comprising:

a seat including a seat cushion and a seat back configured to be inclinable with respect to the seat cushion, an acquiring unit that acquires environment information related to the vehicle in traveling or a surrounding environment of the vehicle; and a control unit that, when the seat is facing a direction different from an advancing direction of the vehicle and the seat back is in an inclined state with respect to the seat cushion at greater than or equal to a predetermined angle, executes a support control for supporting the occupant in the seat to have a posture of the seat on which the occupant is located in a predetermined upright posture to resist an inertial force that is assumed to act on the occupant boarding on the seat and causes a contact surface that comes into contact with the back of the occupant to rise with respect to the seat cushion to bring the seat closer to the predetermined upright posture, as a distance between the vehicle and an obstacle at a periphery thereof, with which collision is assumed, included in the environment information becomes shorter when collision of the vehicle is predicted, based on the environment information, wherein in a case where restraining of the occupant by a restraining device for restraining the occupant located on a seat to the seat is not performed and the seat back is in the inclined state, when collision of the vehicle is detected based on the environment information or determination is made that the collision is inevitable, the control unit executes the restraining of the occupant by the restraining device as the support control to resist the inertial force, the restraining device is a holding net arranged in a ceiling of the vehicle, and the control unit is configured to release the holding net toward the occupant located on the seat to restrain the occupant with respect to the seat when collision of the vehicle is detected or determination is made that the collision is inevitable and when the seat back is in the inclined state.

* * * * *